(12) United States Patent
Johnson et al.

(10) Patent No.: US 11,834,790 B2
(45) Date of Patent: Dec. 5, 2023

(54) SYSTEMS AND METHODS FOR PROVIDING DOCTOR BLADE HOLDERS WITH VIBRATION MITIGATION

(71) Applicant: Kadant Inc., Westford, MA (US)

(72) Inventors: Robert P. Johnson, Sutton, MA (US); David Leeman, Worcester, MA (US); Allen Brauns, Sturbridge, MA (US)

(73) Assignee: Kadant Inc., Westford, MA (US)

( * ) Notice: Subject to any disclaimer, the term of this patent is extended or adjusted under 35 U.S.C. 154(b) by 0 days.

(21) Appl. No.: 17/721,415

(22) Filed: Apr. 15, 2022

(65) Prior Publication Data

US 2022/0243398 A1    Aug. 4, 2022

Related U.S. Application Data

(63) Continuation of application No. 14/263,700, filed on Apr. 28, 2014, now abandoned.

(60) Provisional application No. 61/816,367, filed on Apr. 26, 2013.

(51) Int. Cl.
| | |
|---|---|
| *D21G 7/00* | (2006.01) |
| *F16F 9/30* | (2006.01) |
| *D21G 3/00* | (2006.01) |
| *D21G 3/04* | (2006.01) |
| *F16F 9/50* | (2006.01) |

(52) U.S. Cl.
CPC .............. *D21G 7/00* (2013.01); *D21G 3/00* (2013.01); *D21G 3/005* (2013.01); *D21G 3/04* (2013.01); *F16F 9/30* (2013.01); *F16F 9/50* (2013.01)

(58) Field of Classification Search
CPC ....................................................... F16F 9/30
See application file for complete search history.

(56) References Cited

U.S. PATENT DOCUMENTS

| | | | | |
|---|---|---|---|---|
| 2,193,481 | A | * | 3/1940 | Fawick .............. F16D 25/046 |
| | | | | 152/22 |
| 3,529,315 | A | | 9/1970 | Dunlap et al. |
| 3,688,336 | A | | 9/1972 | Costello et al. |
| 3,711,888 | A | | 1/1973 | Dunlap et al. |
| 3,778,861 | A | | 12/1973 | Goodnow et al. |
| 3,971,583 | A | | 7/1976 | Kornhauser |

(Continued)

FOREIGN PATENT DOCUMENTS

| | | | |
|---|---|---|---|
| CN | 201250226 Y | * | 6/2009 |
| EP | 1045067 A1 | | 10/2000 |

(Continued)

OTHER PUBLICATIONS

Communication pursuant to Rules 161(2) and 162 EPC mailed by the European Patent Office dated Dec. 8, 2015 in connection with related European Patent Application No. 14787461.4, 2 pages.

(Continued)

*Primary Examiner* — Melody M Burch
(74) *Attorney, Agent, or Firm* — Gesmer Updegrove LLP

(57) ABSTRACT

A self-compensating tube assembly is disclosed for use in a doctor blade holder. The self-compensating tube assembly includes a tube including a membrane that encloses a liquid with a substantially invariable bulk modulus of elasticity, density and viscosity; and chatter responsive for providing any of monitoring means of blade chatter through pressure, damping of blade chatter, and minimizing blade chatter.

10 Claims, 13 Drawing Sheets

(56) References Cited

U.S. PATENT DOCUMENTS

| | | | |
|---|---|---|---|
| 4,367,120 | A | 1/1983 | Hendrikz |
| 4,425,798 | A | 1/1984 | Nagai et al. |
| 4,630,328 | A | 12/1986 | Croteau |
| 5,279,710 | A | 1/1994 | Aikawa |
| 6,286,426 | B1 | 9/2001 | Boose |
| 6,328,853 | B1 | 12/2001 | Goodnow et al. |
| 6,786,999 | B2 | 9/2004 | Goodnow et al. |
| 7,121,304 | B2 * | 10/2006 | Gray, Jr. ............... F16L 55/053 138/30 |
| 8,321,992 | B2 | 12/2012 | Gauvin et al. |
| 9,506,192 | B2 | 11/2016 | Johnson et al. |
| 2003/0161956 | A1 | 8/2003 | Makinen et al. |
| 2005/0269753 | A1 | 12/2005 | Geiger et al. |
| 2010/0186770 | A1 | 7/2010 | Johnson et al. |
| 2013/0103326 | A1 | 4/2013 | Von Drasek et al. |

FOREIGN PATENT DOCUMENTS

| | | |
|---|---|---|
| EP | 1149202 B1 | 5/2004 |
| EP | 1746206 A1 | 1/2007 |
| JP | 11012977 A | 1/1999 |
| JP | H1112977 A | 1/1999 |
| WO | 0044981 A1 | 8/2000 |
| WO | 0120077 A1 | 3/2001 |
| WO | 2004005615 A1 | 1/2004 |
| WO | 2013007204 A1 | 1/2013 |
| WO | 2013059055 A1 | 4/2013 |

OTHER PUBLICATIONS

International Preliminary Report on Patentability dated Nov. 5, 2015 in connection with related International Application No. PCT/US2014/035707, 6 pages.
International Search Report and Written Opinion dated Sep. 1, 2014 in connection with International Application PCT/US14/035707, 9 pages.
Office Action issued by the Chinese Patent Office dated Dec. 21, 2016 in related Chinese Patent Application No. 201480030970.4.
Supplementary European Search Report and Opinion issued by the European Patent Office dated Aug. 24, 2016 in related European Patent Application No. 14787461, 7 pages.

* cited by examiner

SYSTEMS AND METHODS FOR PROVIDING DOCTOR BLADE HOLDERS WITH VIBRATION MITIGATION

PRIORITY

The present application is a continuation of U.S. patent application Ser. No. 14/263,700 filed Apr. 28, 2014; which claims priority to U.S. Provisional Patent Application Ser. No. 61/816,367, filed Apr. 26, 2013, the disclosures of which are hereby incorporated by reference in their entireties.

BACKGROUND

The present invention generally relates to doctoring systems, and relates in particular to doctor blade holders that provide improved performance of doctoring systems during the production of tissue and paper.

In certain applications, it is desirable to provide Yankee coating and creping systems having improved reliability within the tissue industry. Yankee dryer blade holders are required to provide near uniform loading across the sheet width, while not causing maintenance issues such as Yankee surface chatter marks. Yankee dryer doctor blade holders are typically comprised of a working blade, and supporting components such as a backup blade and a self-compensating load tube.

U.S. Pat. No. 3,529,315 for example, discloses a liquid filled tube that has a means of assisting the working blade to conform to a roll crown by displacing liquid along its length, and the liquid, being provided at uniform pressure, should result in near uniform blade load. U.S. Pat. No. 3,529,315 also teaches us that the conforming tube may negotiate or follow a high spot on the roll circumference without affecting load to any significant extent. As discussed further below however, such a characteristic encourages low machine direction (MD) stiffness, which is, however, not desirable with regard to unwanted chatter.

U.S. Pat. Nos. 3,688,336; 3,711,888; 3,778,861 and 4,630,328 disclose holder inventions that utilize a liquid tube. U.S. Pat. Nos. 3,688,336 and 3,711,888 disclose a cartridge assembly of which the tube is a component. U.S. Pat. No. 3,778,861 discloses a protective metal sheath for the tube. U.S. Pat. No. 4,630,328 discloses a sealing means to address seal failures during the time period of that patent. The increasingly demanding challenges of Yankee doctoring systems, however, may not be met by the end sealing means that are disclosed in U.S. Pat. No. 4,630,328. If the seal fails, there is loss of liquid, and ingress of air is possible, reducing dynamic stiffness. Thus there becomes a need for improved sealing of the self compensating tube.

It is important that a liquid tube offer load self-compensation to negotiate crown, but it should also maintain suitable local and lengthwise MD stiffness in order to negotiate dynamic changes on the roll circumference. A Yankee blade holder with high dynamic stiffness over an extended frequency range will be able to negotiate a roll surface defect feature. Further, the absence of suitable stiffness will increase the likelihood of self-excited vibration leading to the creation of chatter marks.

The present commercially available tube has numerous features which influence local MD stiffness as well as overall (lengthwise) MD stiffness. The tube assembly is comprised of the tube and the enclosed liquid, and both of these contribute greatly to the MD stiffness; 1) the tube through its material elastic modulus and strength, along with its geometry (thickness, height, width, shape), and 2) the liquid through its bulk modulus of elasticity.

The operating conditions of Tissue machines are increasingly demanding as speed, temperature and loads increase, and Yankee hardness of surface coatings increase. Beyond the conventional approach of improved materials, there becomes a need for additional features in the tube to increase its dynamic stiffness and damping, while retaining the self-compensating features.

The presence of entrained air will reduce the effective bulk modulus of the liquid. Only a small percentage of air by volume will reduce the bulk modulus by as much as two orders of magnitude. Since the tube assembly stiffness is dictated primarily by development of pressure, a lowered bulk modulus is devastating on stiffness.

The tissue industry has placed more emphasis on improved performance of numerous coating and creping parameters. Thus there is a need for improved and additional means of measuring blade load behavior. A typical industry practice is to mount vibration sensors on the doctor beam. These locations however, are removed from the blade tip, and thus unique vibration signatures present in the blade tip may be undetected.

There remains a need therefore, for a system and method for measuring and/or mitigating vibration in certain doctor blade holder systems.

SUMMARY

In accordance with an embodiment, the invention provides a self-compensating tube assembly for use in a doctor blade holder. The self-compensating tube assembly includes a tube including a membrane that encloses a liquid with a substantially invariable bulk modulus of elasticity, density and viscosity; and chatter responsive means for providing any of monitoring of blade chatter through pressure, damping of blade chatter, and minimizing blade chatter.

In accordance with a further embodiment, the invention provides a self-compensating tube assembly for use in a doctor blade holder. The self-compensating tube assembly includes a tube including a membrane that encloses a liquid with a substantially invariable bulk m modulus of elasticity, density and viscosity; and dynamic means for enhancing dynamic stiffness and damping.

In accordance with a further embodiment, the invention provides a method of providing a self-compensating tube assembly for use in a doctor blade holder. The method includes the steps of: providing a tube including a membrane that encloses a liquid with substantially invariable bulk modulus of elasticity, density and viscosity; and providing any of monitoring of blade chatter through pressure, damping of blade chatter and minimizing of blade chatter

BRIEF DESCRIPTION OF THE DRAWINGS

The following description may be further understood with reference to the accompanying drawings in which.

The drawings are shown for illustrative purposes only and are not to scale.

DETAILED DESCRIPTION

The present invention is concerned with providing an improved self-compensating support element for a doctor blade system that operates at higher loads and promotes reduction of blade vibration during the production of tissue and paper. Devices of the invention further may be used as a process monitoring device, in particular as it applies to tissue production and Yankee chatter. Since the tube is in communication with the blade, applicants have discovered that the tube's pressure may be used as an indicator of time variant blade forces associated with chatter events.

Chatter is a dynamic event, involving dynamic motion of blade holder components. Damping, if introduced within degrees of freedom that are participating in the chatter event, will likely decrease motion and therefore decrease the magnitude of chatter. Introducing damping in the self-compensating tube, will likely reduce chatter for those cases in which the tube is part of the vibration mode participating in the chatter event. Conventional devices do not provide damping means nor any measurement using the tube. The tube provides a reactive force against a guide plate that varies along the cross machine direction (CD) to accommodate variations in load during tissue processing.

In the present invention, it is disclosed how to take advantage of the self-compensating element and implement means for proper tube assembly stiffness, blade vibration measurement, and blade vibration mitigation. The present invention provides an improved self-compensating tube for use in Yankee Dryer blade holders, that addresses shortcomings of present designs and adds additional benefits such as vibration monitoring and vibration mitigation means.

Figure 1:
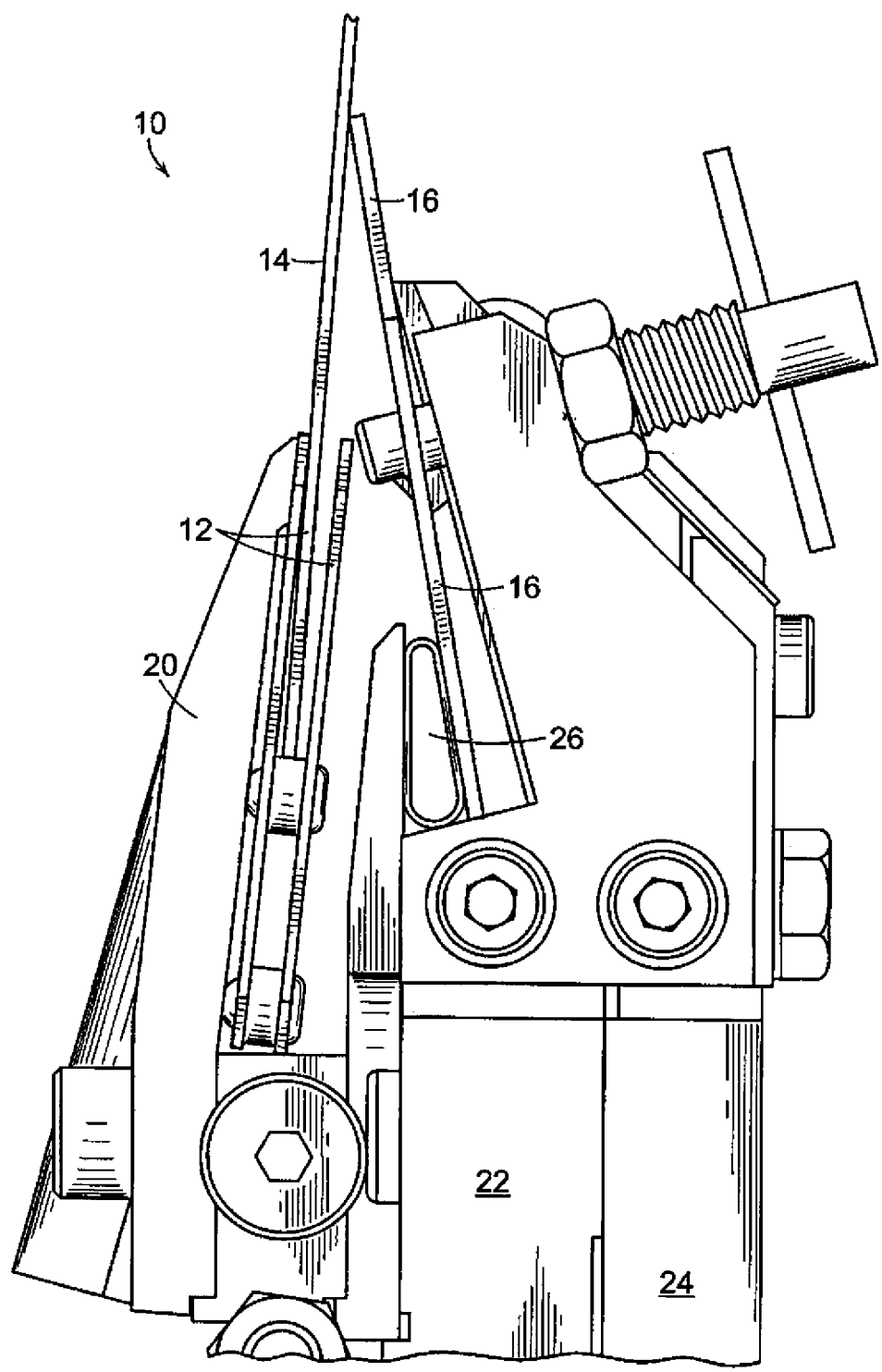
FIG. 1 shows an illustrative diagrammatic view of a doctor blade holder system including a self-compensating load tube assembly in accordance with an embodiment of the invention.

FIG. 1 shows a doctor blade holder 10 that includes a doctor blade holder cartridge 12 for receiving a doctor blade 14, a back-up blade 16 that supports the doctor blade 14, as well as a top plate 20 and a bottom plate 22. The doctor blade holder cartridge 12 may be as disclosed, for example, in U.S.

patent application Ser. No. 14/263,335 filed Apr. 28, 2014, the disclosure of which is hereby incorporated by reference in its entirety. The bottom plate 22 is mounted to a doctor back 24. The doctor blade holder also includes a self-compensating load tube assembly 26 in accordance with an embodiment of the present invention.

Figure 2:
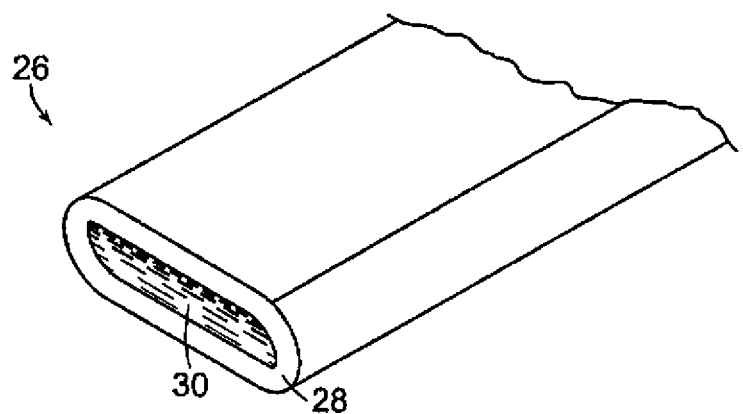
FIG. 2 shows an illustrative diagrammatic view of a self-compensating load tube assembly in accordance with an embodiment of the invention.
Figure 3:
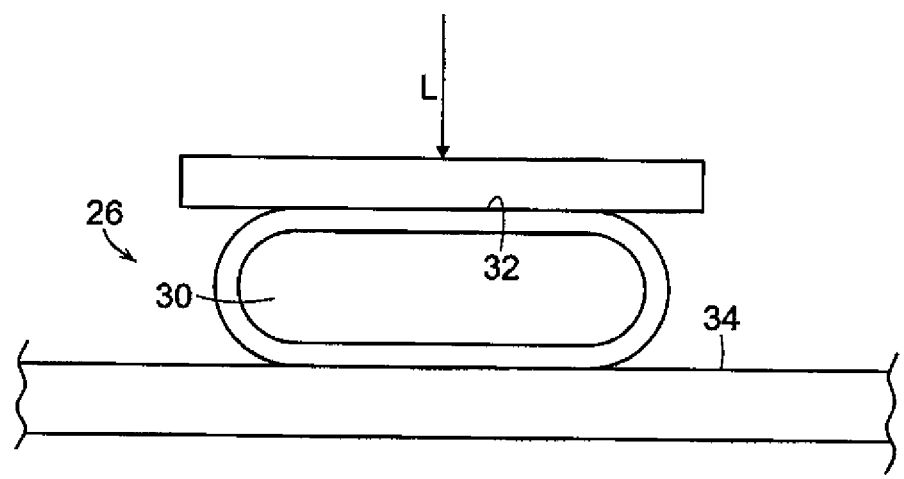
FIG. 3 shows an illustrative diagrammatic view of the self-compensating load tube assembly of FIG. 2 under a load pressure.
Figure 4:
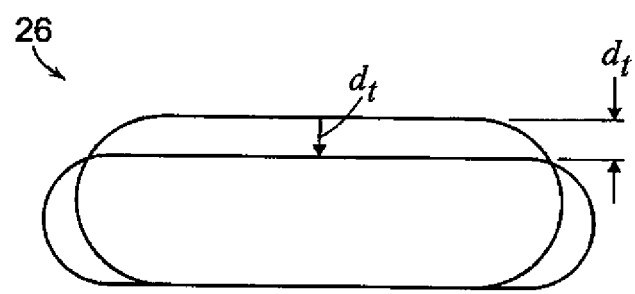
FIG. 4 shows an illustrative diagrammatic superimposed view of a self-compensating load tube assembly in accordance with an embodiment of the invention prior to and during application of a load.

The self-compensating load tube assembly 26 includes a synthetic tube 28 that encloses a liquid 30 as shown in FIG. 2. FIG. 3 demonstrates how stiffness is defined. Load L is applied at surface 32 of tube 26 where tube is constrained against another surface 34, and the tube surface 32 undergoes deflection as shown diagrammatically at $d_t$ in FIG. 4. Stiffness=Load/Deflection. The volume inside the tube 26 will decrease, and subsequently the liquid pressure will increase (as the surface 32 is deflected downward). The stiffness is dominated by the tube Elastic Modulus in both the machine direction (MD) and cross machine direction (CD) directions, and equally so by the bulk modulus of elasticity of the liquid.

Figure 5:
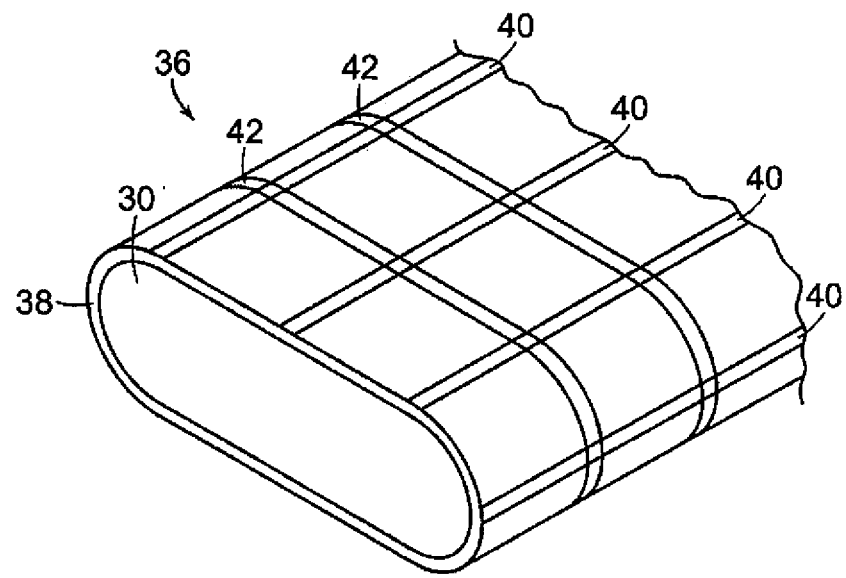
FIG. 5 shows an illustrative diagrammatic view of a self-compensating load tube assembly in accordance with another embodiment of the invention that includes fiber reinforced material.

Preferably the tube behaves very stiff in membrane behavior, less so in bending. To meet this, the tube thickness shall be generally thin, and may include fiber reinforcement added near the neutral axis of the tube wall, so as to maximize membrane stiffness and limit bending stiffness. In the limit, it is observed that too much bending stiffness, such as with a metal tube, will not allow for self-compensation; the tube will be too rigid. FIG. 5, for example, shows a self-compensating load tube assembly 36 that includes thin walls 38 as well as reinforcing fibers 40 that run in the cross machine direction and reinforcement fibers 42 that run in the machine direction. The membrane reinforcement fibers 40, 42 are provided to increase membrane stiffness. Allowing the CD membrane stiffness to achieve high levels is beneficial, as it reduces the tube expansion in the CD due to pressure load; hence higher pressures are achieved for a given deflection.

Blade chatter is a dynamic event, and associated with it are time fluctuating forces. The addition of system damping would generally reduce chatter and chatter development, so if blade chatter involves a mode of which the tube is a part, chatter may be avoided or reduced. Typically, damping within the liquid may be provided via inertial restriction, or viscous restriction (including squeeze film damping effects). Inertial restriction would require substantial density (e.g., air not suitable), viscous restriction would require substantial viscosity.

Figure 6:
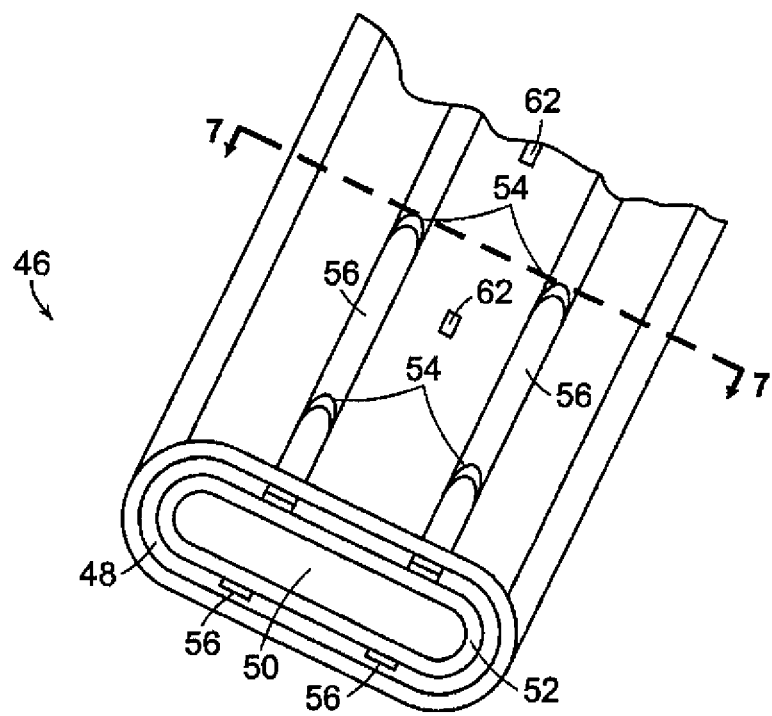
FIG. 6 shows an illustrative diagrammatic view of a self-compensating load tube assembly in accordance with another embodiment of the invention that includes separate and distinct volumetric zones.

FIG. 6 shows an embodiment showing a compartmentalized configuration of a self-compensating load tube assembly 46 in accordance with a further embodiment of the invention in which there are two distinct volumetric zones 48, 50. The self-compensating load tube assembly 46 captures a second internal tubular component 52. Standoffs 54 (provided on rails 56) communicate with the inside surface 58 of the outer tube 60, so that as surface 58, as well as tube 50, is deflected under a load condition.

Figure 7:
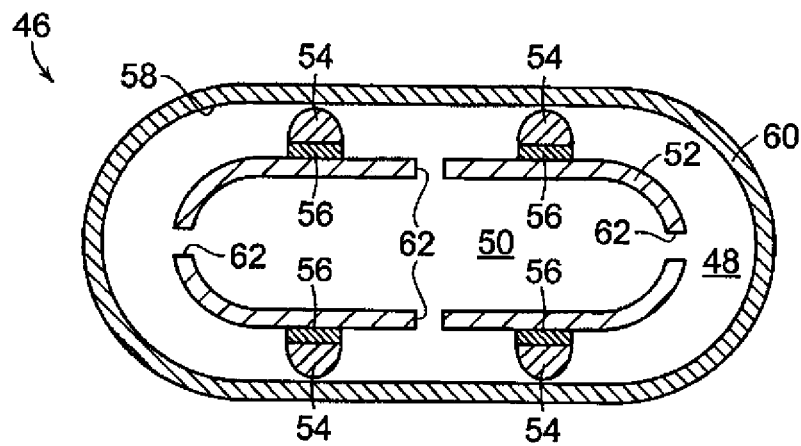
FIG. 7 shows an illustrative diagrammatic sectional view of the self-compensating load tube assembly of FIG. 6 taken along line 7-7 thereof.

FIG. 7 shows a sectional view of the self-compensating load tube assembly 46 of FIG. 6. The internal volume of tube 60 and component 52 are each filled with liquid. As the surface 58 deflects, the volume of the outer tube 60 is decreased and corresponding pressure increases. Similarly the volume of the internal tubular component 52 is decreased and there will be an exchange of liquid through inertial restrictors 62 that separate the volume of the internal tubular component 52 and the volume of the outer tube 60. The restrictors 62 may be placed along the lengthwise direction. The standoffs 54 may be continuous in the lengthwise direction in certain embodiments. In further embodiments, the standoffs may themselves include restrictors. If the standoffs are continuous, then the internal volume is further compartmentalized, and additional damping may be achieved.

Figure 8:
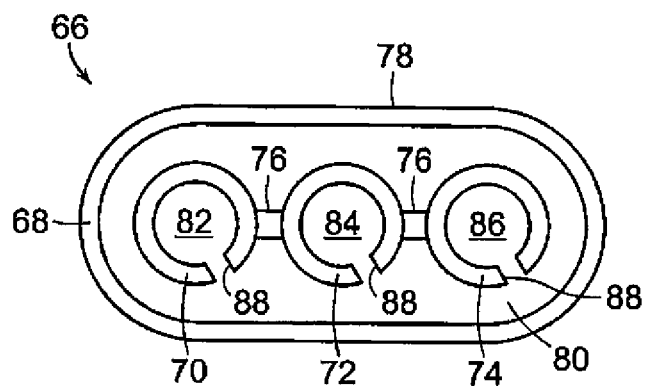
FIG. 8 shows an illustrative diagrammatic view of a self-compensating load tube assembly in accordance with another embodiment of the invention that includes individual smaller parallel tubes.

Another embodiment of a self-compensating load tube assembly 66 in accordance with an embodiment of the invention includes separate volumes with inertial restrictors as shown in FIG. 8 (and as discussed above). The self-compensating load tube assembly 66 includes an outer tube 68 as well as individual smaller tubes 70, 72, 74, which can be separated from each other or connected via ribs 76. Deflection of surface 78 causes pressure changes in volume 80, and results in fluid exchange with volumes 82, 84, 86 across inertial restrictors 88.

Figure 9:
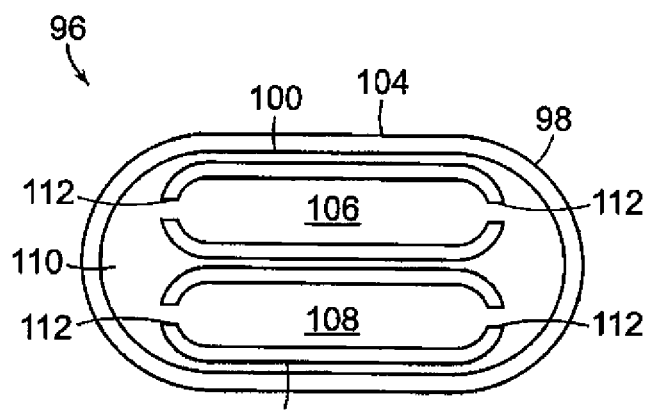
FIG. 9 shows an illustrative diagrammatic view of a self-compensating load tube assembly in accordance with another embodiment of the invention that includes a stacked pair of narrow tubes.

In accordance with a further embodiment of the invention, a self-compensating load tube assembly 96 includes an outer tube 98, as well as two stacked internal narrower tubes 100, 102 as shown in FIG. 9. When surface 104 is deflected, volumes 106, 108 within tubes 100, 102 will exchange liquid with volume 110 of the outer tube 98 across restrictors 112 (as discussed above).

Figure 10:
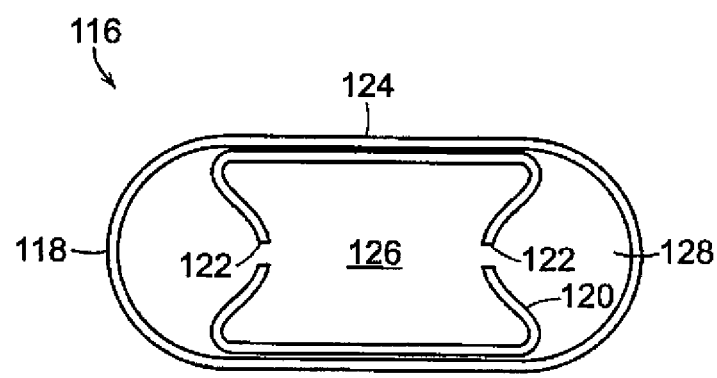
FIG. 10 shows an illustrative diagrammatic view of a self-compensating load tube assembly in accordance with another embodiment of the invention that includes a means for providing dynamic inertial restriction.
Figure 11:
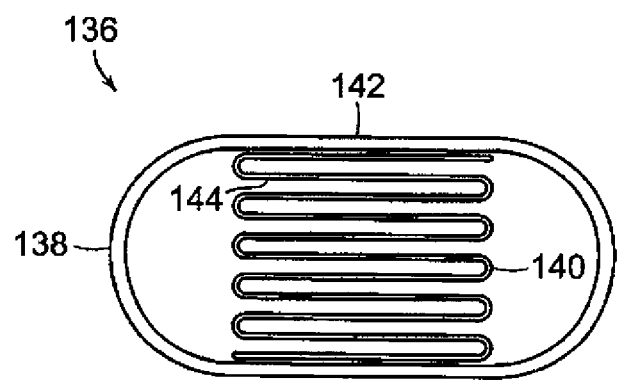
FIG. 11 shows an illustrative diagrammatic view of a self-compensating load tube assembly in accordance with another embodiment of the invention that provides squeeze film damping.

In accordance with still another embodiment of the invention, a self-compensating load tube assembly 116 is shown in FIG. 10. The self-compensating load tube assembly 116 includes an outer tube 118 as well as an internal tube 120 that includes restrictors 122 (as discussed above). Tube 118 captures an internal tube 120. When surface 124 is deflected, volume 126 within tube 120 decrease, hence an increase in pressure will result in fluid exchange with volume 128 of outer tube 118 across restrictors 122.

In accordance with a further embodiment on the invention, self-compensating load tube assembly 136 may provide squeeze film damping as shown in FIG. 10. In particular, the self-compensating load tube assembly 136 includes an outer tube 138 that encloses a multiple layered component 140, which may be a separate component or integrated within tube 138, for example in an as extruded configuration. As the surface 142 is deflected, so do the multiple surfaces 144 of the layered component 140, and liquid is squeezed in and out of the region between layers. With liquid as the internal fluid, having reasonable viscosity, an average gap of 0.005 inches between layers should introduce reasonable damping.

Figure 12:
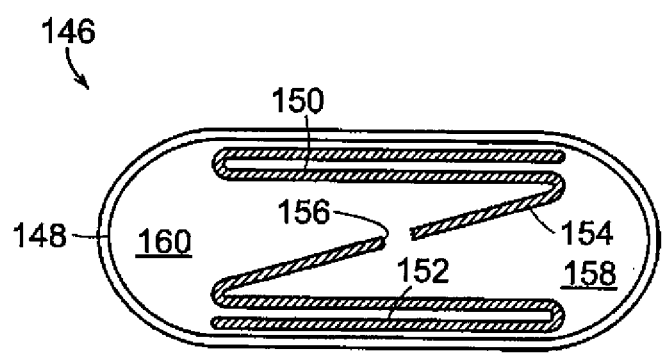
FIG. 12 shows an illustrative diagrammatic view of a self-compensating load tube assembly in accordance with another embodiment of the invention that providing squeeze film damping via an internal spring.

FIG. 12 shows a self-compensating load tube assembly in accordance with a further embodiment of the invention. The self-compensating load tube assembly 146 includes an outer tube 148 as well as a layered component 150 that provides a squeeze film effect. The layered component 150 includes interfacing surfaces (e.g., 152) that function as discussed above, as well as a spring component When under a load condition, an optional inertial restrictor 156 (as discussed above with reference to internal tubes) provides communication between volume zone 158 and volume zone 160.

Figure 13:
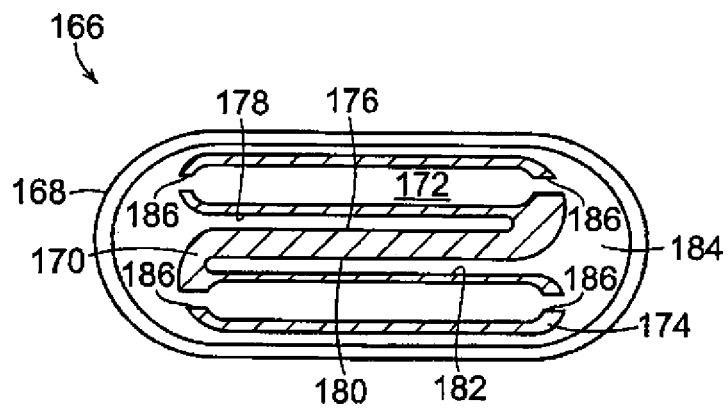
FIG. 13 shows an illustrative diagrammatic view of a self-compensating load tube assembly in accordance with another embodiment of the invention that provides squeeze film damping and in which volume is compartmentalized.

In FIG. 13 shown a self-compensating load tube assembly 166 in accordance with a further embodiment of the invention. In the embodiment of FIG. 13, internal volume is also compartmentalized, such that both squeeze film effects and inertial restriction are present. In particular, the self-compensating load tube assembly 166 includes an outer tube 168 that contains a layered component 170 that provides first and second volumetric zones 172, 174, as well as a layered section that provides a squeeze film effect between surfaces 176 and 178 as well as between surfaces 180 and 182. Fluid exchange also occurs between volume 184 and volumes 172, 174 across restrictors 186 (as discussed above).

Figure 14:
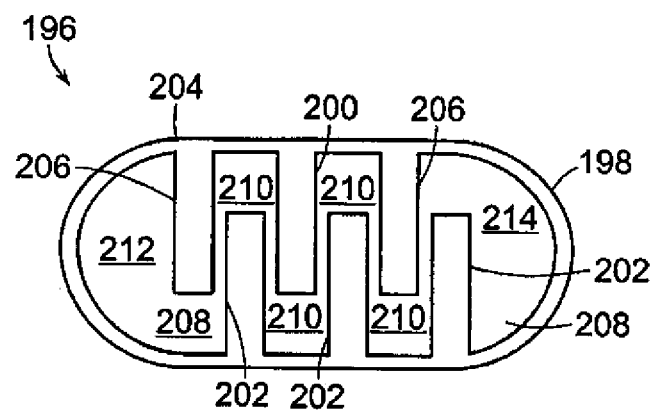
FIG. 14 shows an illustrative diagrammatic view of a self-compensating load tube assembly in accordance with another embodiment of the invention that provides shear between adjacent surfaces of upper and lower stand-off surfaces and restrictor flow either inertial or viscous.

FIG. 14 shows a further embodiment of self-compensating load tube assembly 196. The self-compensating load tube assembly 196 includes an outer tube 198 that encloses a liquid, wherein the inner surface of the outer tube 198 is serpentine, extending into the interior of the tube assembly with protruding walls 200, 202 from the upper to lower and lower to upper surfaces that complement one another as shown. When surface 204 of tube 198 is deflected downward, liquid is sheared between adjacent surfaces of upper standoffs 206 (provided by protrusions 200) and lower standoffs 208 (provided by protrusions 202). Further, the compartmentalized volumes 210 are reduced, forcing flow across gaps between upper and lower standoffs to outboard volumes 212 and 214. The gaps behave as restrictors (continuous restrictors), and depending on the gap size will be inertial dominated or viscous dominated.

Figure 15:
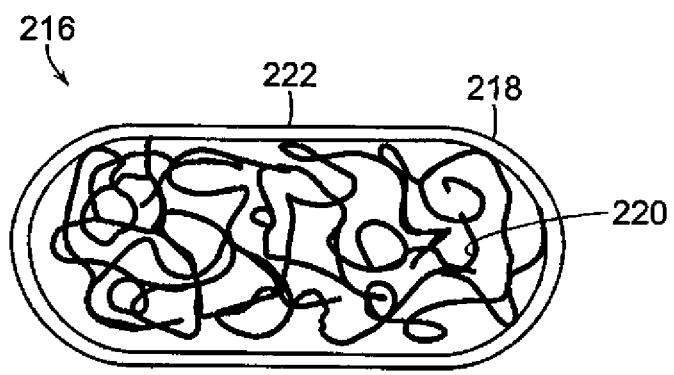
FIG. 15 shows an illustrative diagrammatic view of a self-compensating load tube assembly in accordance with another embodiment of the invention that includes an open cell foam compartment.

FIG. 15 shows an example of a self-compensating load tube assembly 216 in accordance with a further embodiment of the invention that includes an outer tube 218 that contains as well as an open cell foam component 220. Liquid fills all remaining volume. As surface 222 is deflected dynamically downward, liquid will be transported within random voids (of changing geometry) of the open cell foam. The fluid transport will be inertial, viscous, or both, resulting in damped movement.

Figure 16:
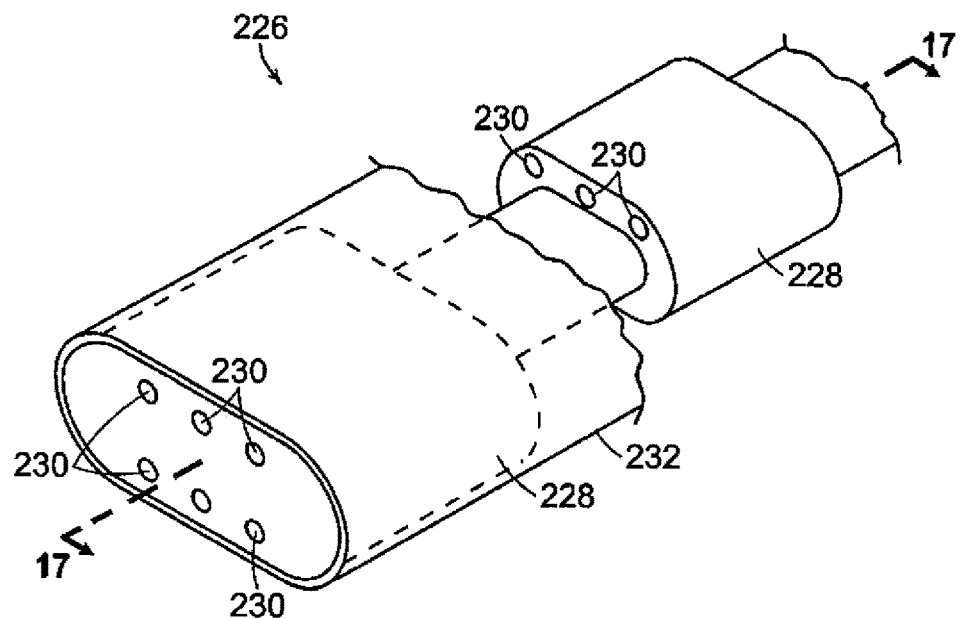
FIG. 16 shows an illustrative diagrammatic view of a self-compensating load tube assembly in accordance with another embodiment of the invention that provides lengthwise compartmentalization of the liquid.
Figure 17:
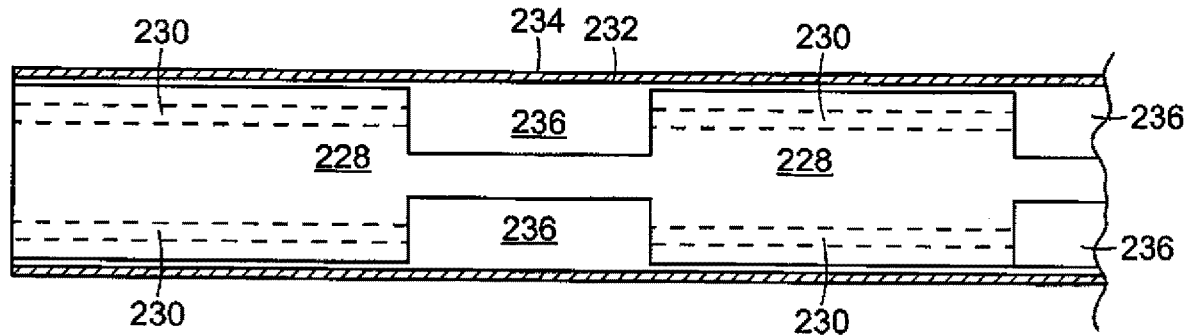
FIG. 17 shows an illustrative diagrammatic sectional view of the self-compensating load tube assembly of FIG. 16 taken along line 17-17 thereof.

FIG. 16 shows a self-compensating load tube assembly 226 in accordance with a further embodiment of the invention that includes volumes that are compartmentalized in lengthwise sense. In particular, the tube assembly 226 includes multiple insert components 228, each of which includes restrictor passages 230, as well as an outer tube 232 that contains the components 228. FIG. 17 shows a sectional view of a portion of the tube assembly of FIG. 16 taken along line 17-17 thereof. When lengthwise variations in tube dynamic deflection occur at surface 234, liquid flows between volumes 236 through the restrictor passages 230.

The aforementioned embodiments utilize fluid transport across restrictors (either discrete or continuous) that invoke inertial or viscous resistance. There will be other configurations in addition to those shown, that would be consistent with the scope and spirit of the invention.

Figure 18:
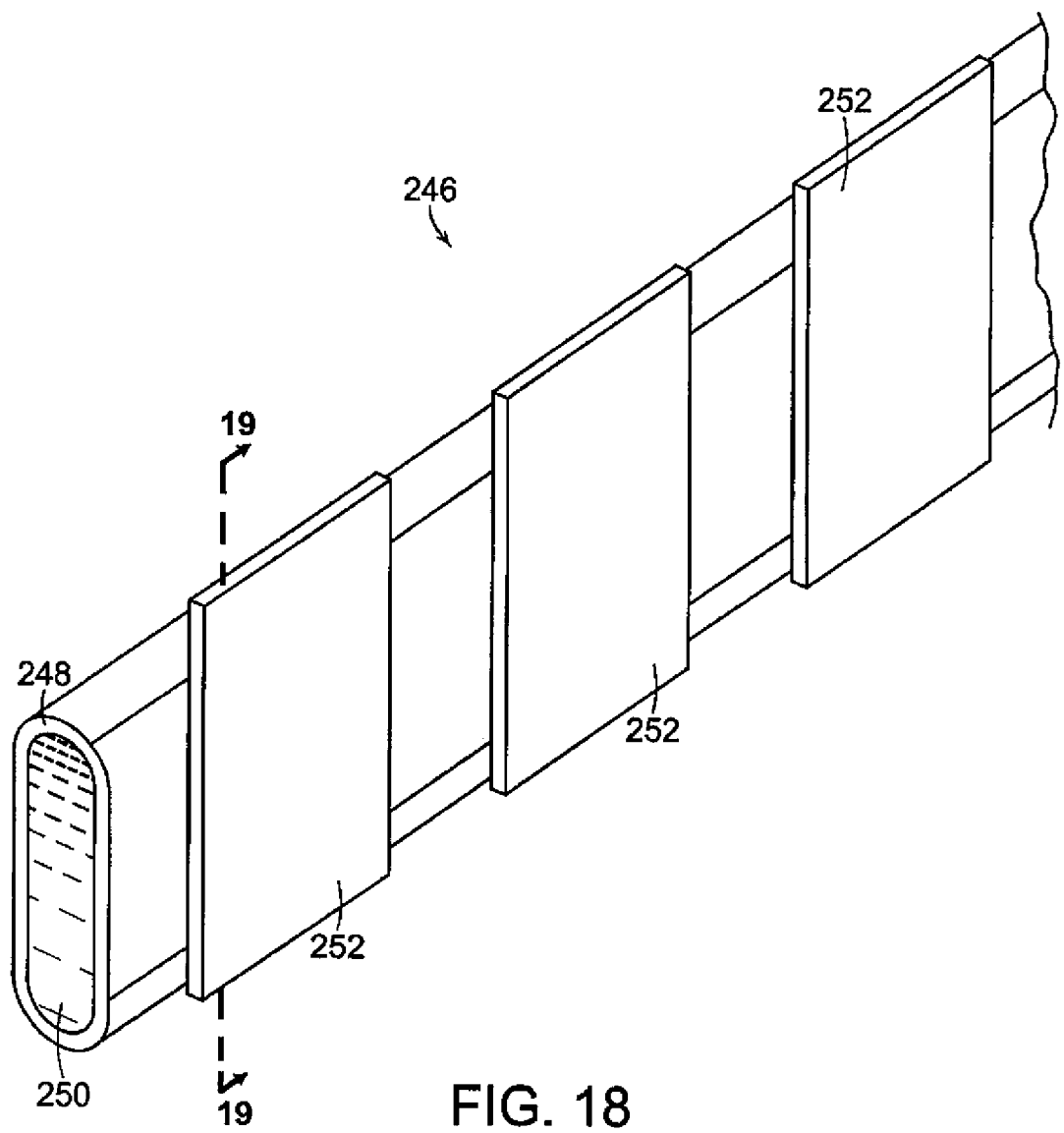
FIG. 18 shows an illustrative diagrammatic view of a self-compensating load tube assembly in accordance with another embodiment of the invention that includes magnetorheologhical fluid and adjacent magnetic field sources.
Figure 19:
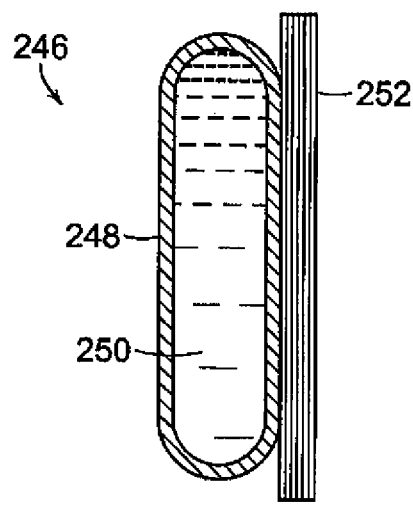
FIG. 19 shows an illustrative diagrammatic end view of the self-compensating load tube assembly of FIG. 18 taken along line 19-19 thereof.
Figure 20:
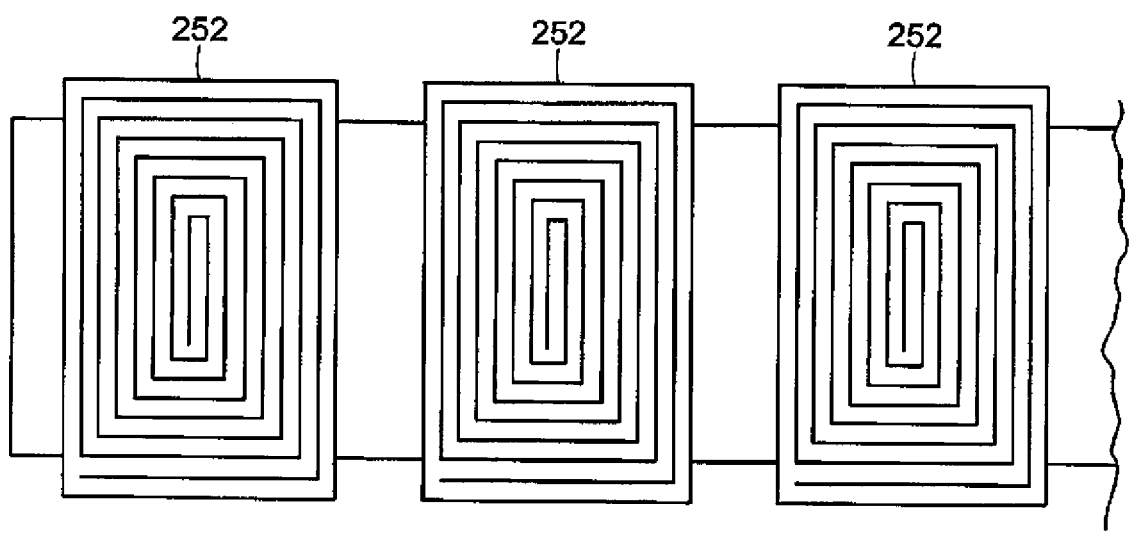
FIG. 20 shows an illustrative diagrammatic side view of the self-compensating load tube assembly of FIG. 18 taken along line 20-20 thereof.

FIG. 18 shows a self-compensating load tube assembly 246 in accordance with a further embodiment of the invention that includes an outer tube 248, magnetorheological fluid 250, and adjacent discrete magnetic field sources 252. FIG. 19 shows a sectional view of the tube assembly of FIG. 18 taken along line 19-19 thereof showing wires within the magnetic field sources 252. The discrete magnetic field sources may not be attached to the tube (the tube in fact may be attached to the back-up blade). The tube and the magnetic field sources are shown to be positioned near each other. FIG. 20 shows a diagrammatic side view of the tube assembly with the coils of wires within the magnetic fields sources 252 visible. The presence of a magnetic field aligns carbon particles within the magnetorheological liquid, making the liquid very stiff(solid-like). The extent of stiffness can be varied with the strength of the magnetic field, and may be individually adjusted for each magnetic field source along the length of the tube assembly.

Figure 21:
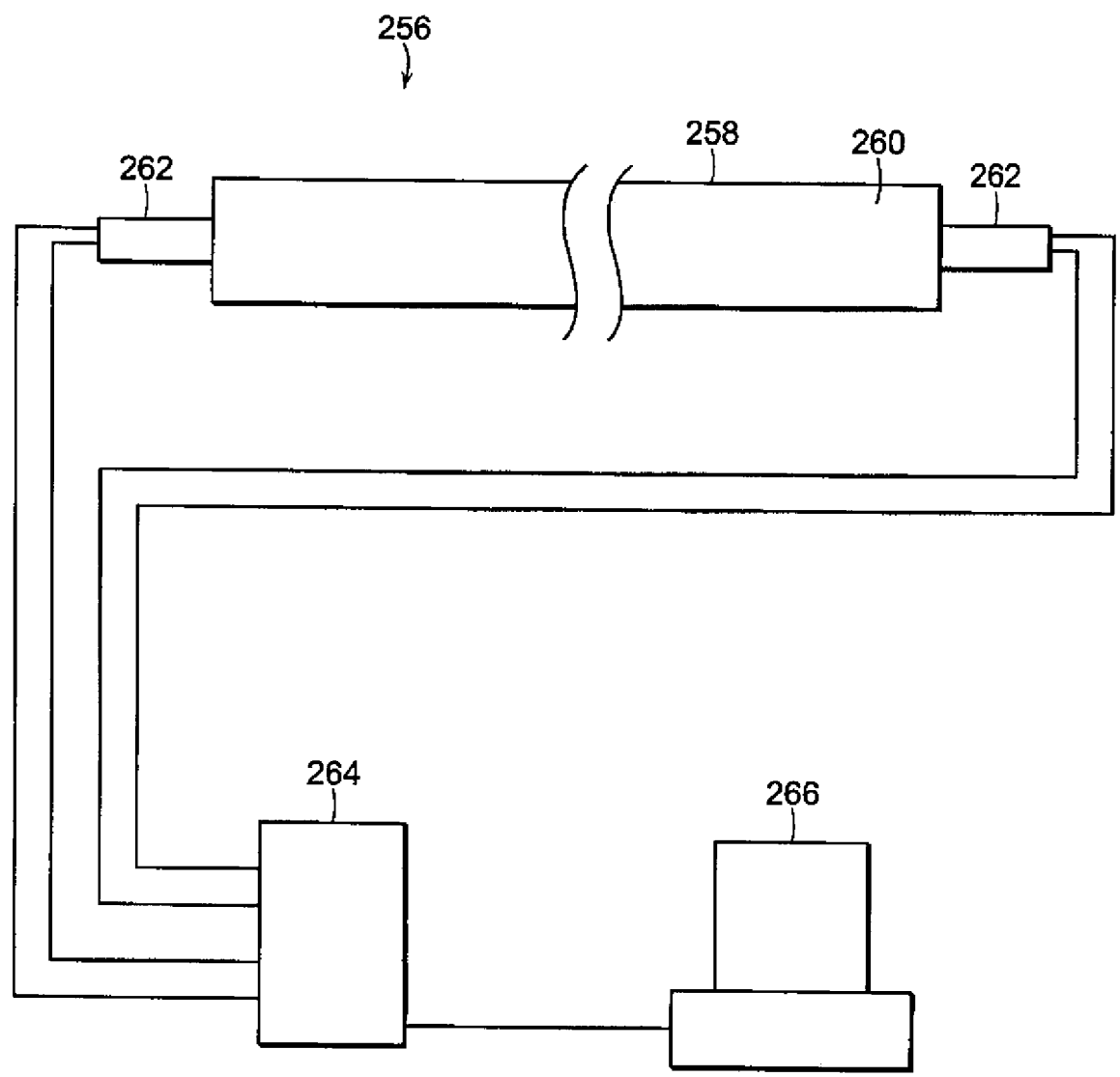
FIG. 21 shows an illustrative diagrammatic view of a self-compensating load tube assembly in accordance with another embodiment of the invention that includes dynamic pressure sensors.

The tube assembly may be used to assist in process monitoring. Blade vibration may involve modes that introduce motion at the self-compensating tube, as described above. Such dynamic motion will create fluctuating pressure inside the tube assembly. This pressure may be measured using a dynamic pressure sensor, suitable to extremely high frequency. FIG. 21 for example, shows a self-compensating load tube assembly 256 that includes an outer tube 258 that is filled with liquid 260. At each end of the outer tube 258, a dynamic pressure sensor 262 is connected. The sensor signal from each dynamic pressure sensor 262 is sent to a spectrum analyzer 264. Monitoring the spectrum via a display device 266 that is coupled to the analyzer 264 may provide insight to the health of the tissue making processing at the Yankee dryer holder locations.

Figure 22:
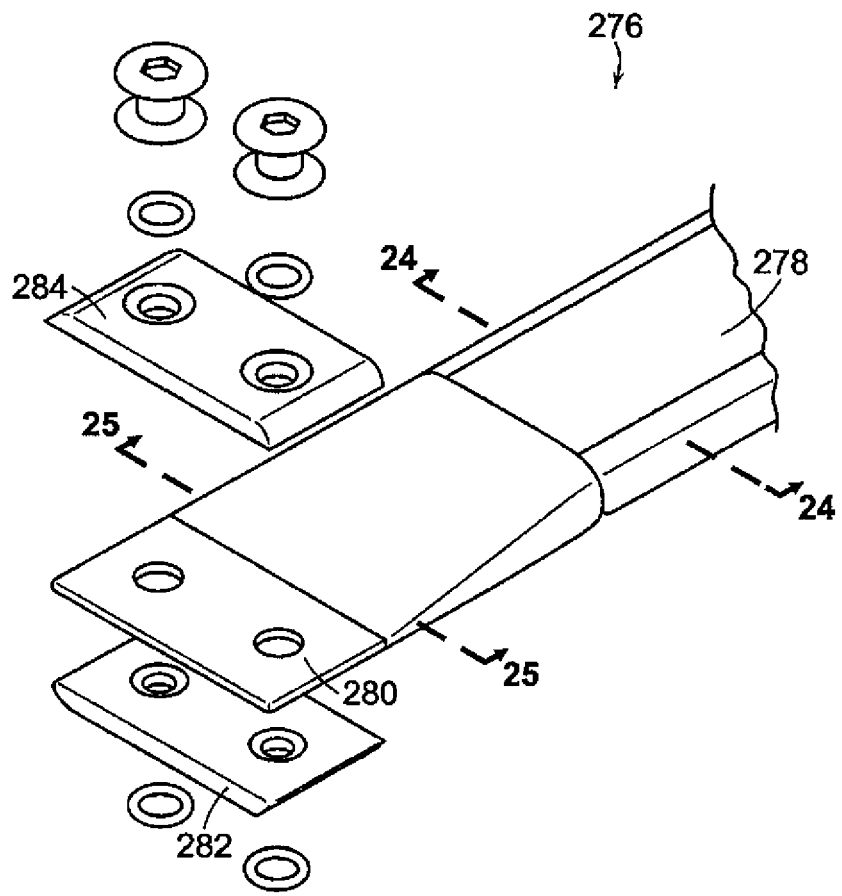
FIG. 22 shows an illustrative diagrammatic exploded view of a self-compensating load tube assembly in accordance with another embodiment of the invention that provides improved end sealing.
Figure 23:
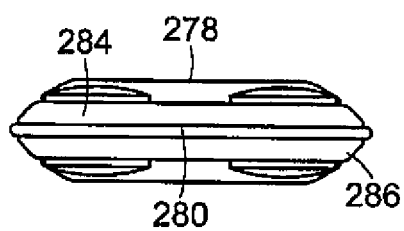
FIG. 23 shows an illustrative diagrammatic end view of the self-compensating load tube assembly of FIG. 22 taken along line 23-23 thereof.
Figure 24:
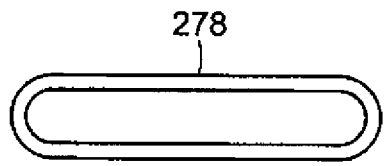
FIG. 24 shows an illustrative diagrammatic view of the self-compensating load tube assembly of FIG. 22 taken along line 24-24 thereof.
Figure 25:
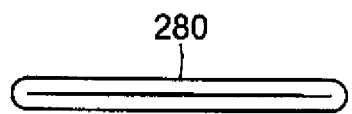
FIG. 25 shows an illustrative diagrammatic view of the self-compensating load tube assembly of FIG. 22 taken along line 25-25 thereof.
Figure 26:
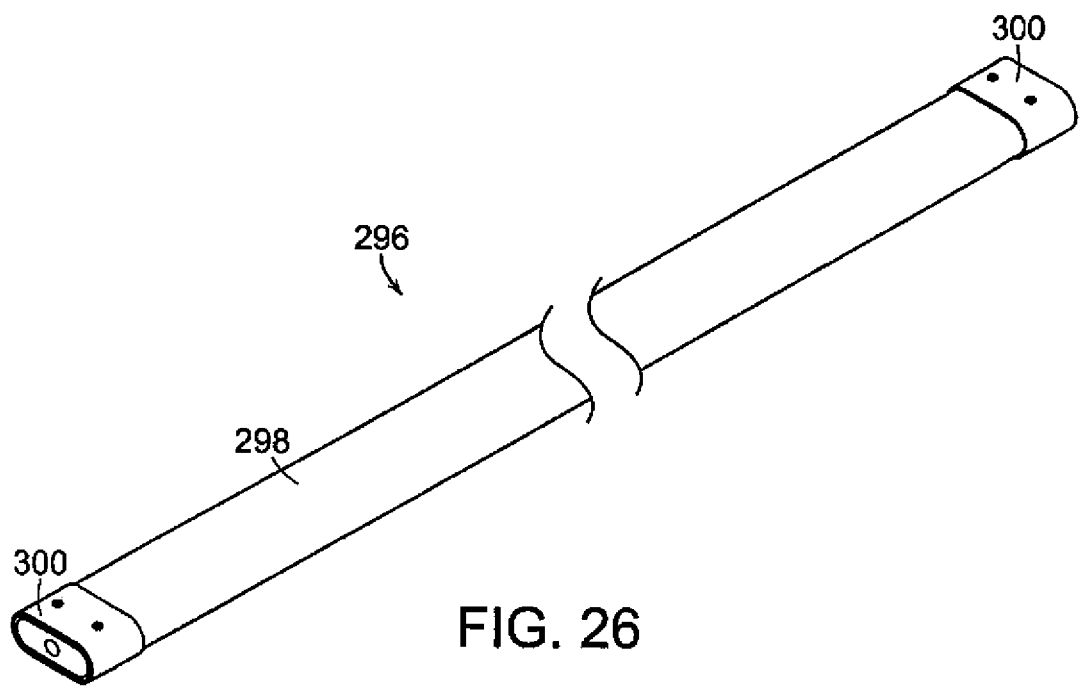
FIG. 26 shows an illustrative diagrammatic view of a self-compensating load tube assembly in accordance with another embodiment of the invention that use alignment pins.

Contemporary load levels also challenge the sealing means at the tube ends, which currently utilizes a crimped elastomer insert, and prior to that crimped metal insert and heat sealing. FIG. 22 shows an end of a self-compensating load tube assembly 276 in accordance with an embodiment that improves on the current as well as past sealing means. The tube assembly 276 may include an outer tube 278 formed of geometry such as shown in cross section at FIG. 24, and the outer tube is provided as in a flattened geometry as shown in FIG. 25 by heating at the ends 280. Two clamp components 282, 284 provide a clamping load to the flattened tube region 280 to seal it from liquid egress, or air ingress. Fastener components provide the preload to the clamp assembly, and O-rings provide secondary sealing in the event there was otherwise leakage past holes in the ends 280.

Figure 27:
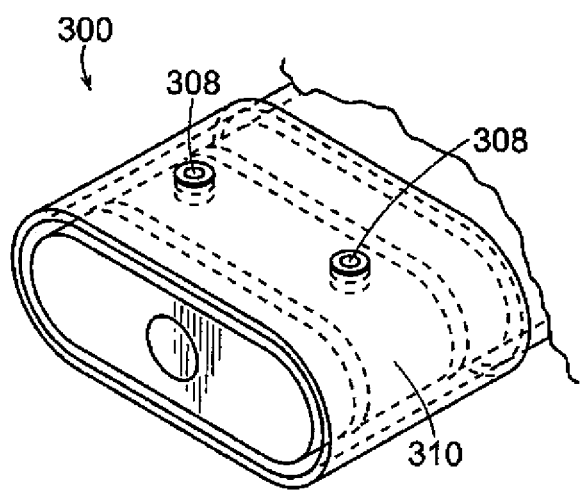
FIG. 27 shows an illustrative diagrammatic enlarged view of an end portion of the self-compensating load tube assembly of FIG. 26.
Figure 28:
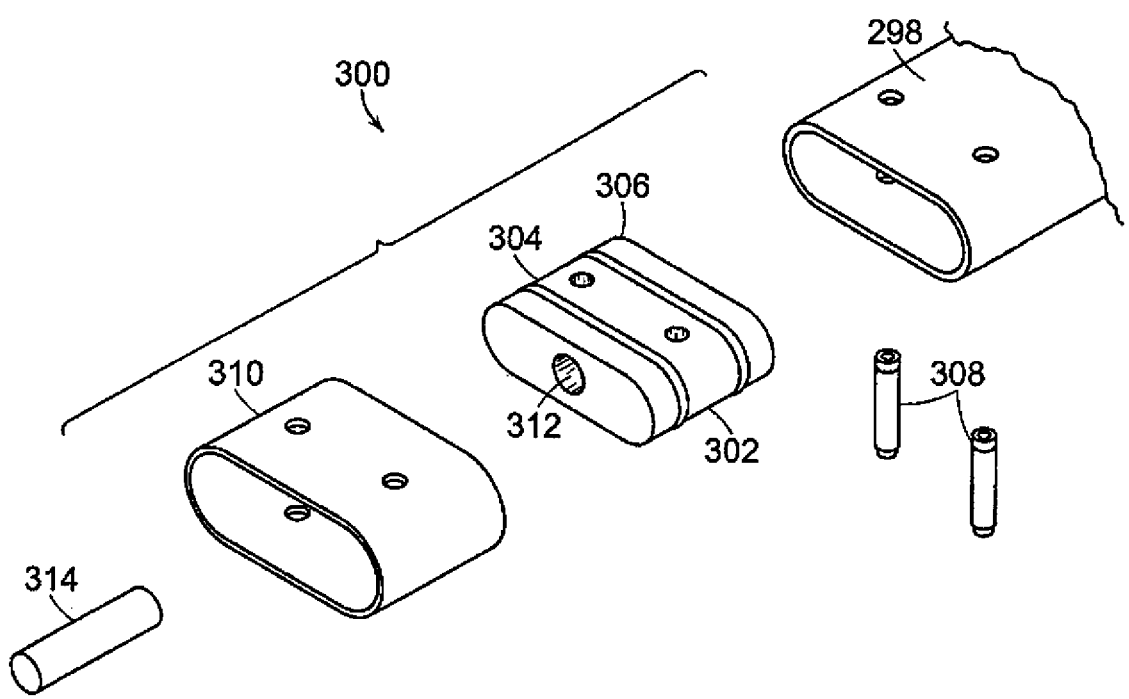
FIG. 28 shows an illustrative diagrammatic exploded view of the end portion of the self-compensating load tube assembly of FIG. 26.

In accordance with another embodiment, a self-compensating load tube assembly 296 that includes an outer tube 298 as well as sealed ends 300. With reference to FIGS. 27 and 28, each sealed end 300 includes an insert 302, with grooves to receive O-rings 304 and 306. O-ring 306 seals the tube inside surface and groove the groove from liquid leakage, and ingress of air. O-ring 304 serves more of an assembly alignment purpose, and a secondary seal. The insert 302 is held in place by pins 308, or other suitable means such as fasteners or rivets. Pins 308 contain insert 302 and also capture sleeve 310, completing assembly 300. An optional fill hole 312 allows the tube to be filled with liquid after end sealing components are assembled to the tube. A seal pin 314 is then inserted into the fill hole 312 after filling process is complete. Alternatively the tube could be filled first, then the end sealing components assembled, in which case fill hole 312 and pin 314 are not required. Further, fill hole 312 could receive the above mentioned pressure sensor.

Those skilled in the art will appreciate that numerous modifications and variations may be made to the above disclosed embodiments without departing from the spirit and scope of the present invention.

What is claimed is:

1. A system for damping blade chatter in a doctor blade holder, comprising:
    a doctor blade;
    a doctor blade holder cartridge that receives the doctor blade; and
    a back-up blade having a first end portion that supports the doctor blade and a second end portion opposite the first end portion; and
    a tube disposed between the second end portion of the back-up blade and a fixed portion of the doctor blade holder cartridge, wherein the tube contains a liquid and an inner damping element that restricts movement of the liquid within the tube in response to the second end portion of the back-up blade causing a surface deflection of the tube,
    wherein the inner damping element comprises a plurality of inner tubular components, each of the inner tubular components having one or more fluid transport restrictors defined therein, wherein the liquid is exchanged through the one or more fluid transport restrictors between a volumetric zone inside each of the inner tubular components and another volumetric zone within the tube that is outside the plurality of inner tubular components in response to the surface deflection of the tube.

2. The system of claim 1, wherein the inner damping element provides any of an inertial resistance and a viscous resistance to restrict the movement of the liquid within the tube in response to the surface deflection of the tube.

3. A system for damping blade chatter in a doctor blade holder, comprising:
a doctor blade;
a doctor blade holder cartridge that receives the doctor blade; and
a back-up blade having a first end portion that supports the doctor blade and a second end portion opposite the first end portion; and
a tube disposed between the second end portion of the back-up blade and a fixed portion of the doctor blade holder cartridge, wherein the tube contains a liquid and an inner damping element that restricts movement of the liquid within the tube in response to the second end portion of the back-up blade causing a surface deflection of the tube,
the inner damping element comprising one inner tubular component having a plurality of fluid transport restrictors defined therein and a plurality of standoffs positioned outside the inner tubular component such that the volumetric zone outside the inner tubular component is compartmentalized into a plurality of individual volumetric zones,
wherein the liquid is exchanged through the plurality of fluid transport restrictors between the volumetric zone inside the inner tubular component and the plurality of individual volumetric zones outside the inner tubular component in response to the surface deflection of the tube.

4. The system of claim 1, wherein the inner damping element further comprises one or more ribs that interconnect the plurality of inner tubular components.

5. The system of claim 1, wherein the plurality of inner tubular components are stacked on each other within the tube.

6. A system for damping blade chatter in a doctor blade holder, comprising:
a doctor blade;
a doctor blade holder cartridge that receives the doctor blade; and
a back-up blade having a first end portion that supports the doctor blade and a second end portion opposite the first end portion; and
a tube disposed between the second end portion of the back-up blade and a fixed portion of the doctor blade holder cartridge, wherein the tube contains a liquid and an inner damping element that restricts movement of the liquid within the tube in response to the second end portion of the back-up blade causing a surface deflection of the tube,
the inner damping element comprising an inner tubular component having a cross-sectional shape in a form of an hourglass and one or more fluid transport restrictors defined in curved sides of the inner tubular component, wherein the liquid is exchanged within the tube between volumetric zones inside and outside of the inner tubular component through the one or more fluid transport restrictors in response to the surface deflection of the tube.

7. A system for damping blade chatter in a doctor blade holder, comprising:

a doctor blade;
a doctor blade holder cartridge that receives the doctor blade; and
a back-up blade having a first end portion that supports the doctor blade and a second end portion opposite the first end portion; and
a tube disposed between the second end portion of the back-up blade and a fixed portion of the doctor blade holder cartridge, wherein the tube contains a liquid and an inner damping element that restricts movement of the liquid within the tube in response to the second end portion of the back-up blade causing a surface deflection of the tube,
wherein the inner damping element includes a singular component having a serpentine shape that forms a plurality of layers, wherein the singular component provides a viscous resistance as the liquid is squeezed in and out of regions between the plurality of layers in response to the surface deflection of the tube.

8. The system of claim 7, wherein the singular component has at least one fluid transport restrictor defined therein, wherein the liquid is exchanged between volumetric zones on opposite sides of the singular component in response to the surface deflection of the tube.

9. A system for damping blade chatter in a doctor blade holder, comprising:
a doctor blade;
a doctor blade holder cartridge that receives the doctor blade; and
a back-up blade having a first end portion that supports the doctor blade and a second end portion opposite the first end portion; and
a tube disposed between the second end portion of the back-up blade and a fixed portion of the doctor blade holder cartridge, wherein the tube contains a liquid and an inner damping element that restricts movement of the liquid within the tube in response to the second end portion of the back-up blade causing a surface deflection of the tube,
wherein the inner damping element includes a layered component that comprises a first inner tubular component defining a first volumetric zone and a second inner tubular component defining a second volumetric zone, the first inner tubular component being coupled to the second inner tubular component by a layered section, the layered section having an upper surface adjacent a lower surface of the first inner tubular component and the layered section having a lower surface adjacent an upper surface of the second inner tubular component,
wherein the inner damping element provides an inertial restriction by exchanging the liquid through a plurality of fluid transport restrictors defined in the first and second inner tubular components between the first volumetric zone, the second volumetric zone, and a third volumetric zone outside the first and second volumetric zones within the tube, and
wherein the inner damping component provides a squeeze film effect between the upper surface of the layered section and the lower surface of the first inner tubular component and between the lower surface of the layered section and the upper surface of the second inner tubular component.

10. A system for damping blade chatter in a doctor blade holder, comprising:
a doctor blade;
a doctor blade holder cartridge that receives the doctor blade; and a back-up blade having a first end portion that supports the doctor blade and a second end portion opposite the first end portion; and a tube disposed between the second end portion of the back-up blade and a fixed portion of the doctor blade holder cartridge, wherein the tube contains a liquid and an inner damping element that restricts movement of the liquid within the tube in response to the second end portion of the back-up blade causing a surface deflection of the tube, the inner damping element comprising a plurality of opposing protrusions that extend from an inner surface of the tube into an interior of the tube, wherein the liquid flows across gaps formed between the plurality of opposing protrusions to volumetric zones on opposite ends of the tube in response to the surface deflection of the tube, and wherein the plurality of opposing protrusions comprise a first plurality of protrusions are arranged to interleave with a second plurality of protrusions that oppose the first plurality of protrusions.

* * * * *